United States Patent
Malhotra et al.

(10) Patent No.: US 12,106,160 B2
(45) Date of Patent: Oct. 1, 2024

(54) FIRST HOP GATEWAY REDUNDANCY IN A NETWORK COMPUTING ENVIRONMENT

(71) Applicant: Arrcus Inc., San Jose, CA (US)

(72) Inventors: Neeraj Malhotra, Los Gatos, CA (US); Keyur Patel, San Jose, CA (US); Derek Man-Kit Yeung, Fremont, CA (US); Lawrence Rolfe Kreeger, Fremont, CA (US); Shitanshu Shah, Cupertino, CA (US); Lalit Kumar, Milpitas, CA (US); Kalyani Rajaraman, San Jose, CA (US); Vikram Ragukumar, Pleasanton, CA (US); Nalinaksh Pai, San Ramon, CA (US)

(73) Assignee: Arrcus Inc., San Jose, CA (US)

( * ) Notice: Subject to any disclaimer, the term of this patent is extended or adjusted under 35 U.S.C. 154(b) by 0 days.

(21) Appl. No.: 16/549,852

(22) Filed: Aug. 23, 2019

(65) Prior Publication Data
US 2020/0067812 A1    Feb. 27, 2020

Related U.S. Application Data

(60) Provisional application No. 62/722,003, filed on Aug. 23, 2018.

(51) Int. Cl.
*G06F 9/54* (2006.01)
*G06F 9/455* (2018.01)
(Continued)

(52) U.S. Cl.
CPC .......... *G06F 9/542* (2013.01); *G06F 9/45558* (2013.01); *G06F 9/4881* (2013.01);
(Continued)

(58) Field of Classification Search
CPC ..... H04L 45/22; H04L 12/2881; H04L 12/44; H04L 12/462; H04L 12/4633;
(Continued)

(56) References Cited

U.S. PATENT DOCUMENTS 5,873,076 A    2/1999  Barr
6,879,594 B1   4/2005  Lee
(Continued)

FOREIGN PATENT DOCUMENTS

CA    2279845 A1    5/1998
CN    101848236 A   9/2010
(Continued)

OTHER PUBLICATIONS

Sajassi et al., BGP MPLS-Based Ethernet VPN, Feb. 2015 (Year: 2015).*

(Continued)

*Primary Examiner* — William G Trost, IV
*Assistant Examiner* — Abdelbasst Talioua
(74) *Attorney, Agent, or Firm* — David R. Stevens; Stevens Law Group

(57) ABSTRACT

Systems, methods, and devices for improved routing operations in a network computing environment. A system includes a first switch and a second switch in a network topology. The system includes a host virtual machine in communication with at least one of the first switch and the second switch. The system includes a routed peer link connecting the first switch to the second switch. The system is such that the first switch and the second switch have the same Internet protocol (IP) address and media access control (MAC) address.

17 Claims, 11 Drawing Sheets

(51) Int. Cl.

| | | |
|---|---|---|
| *G06F 9/48* | (2006.01) | |
| *G06F 16/22* | (2019.01) | |
| *G06F 16/23* | (2019.01) | |
| *G06F 16/27* | (2019.01) | |
| *H04L 9/40* | (2022.01) | |
| *H04L 12/28* | (2006.01) | |
| *H04L 12/44* | (2006.01) | |
| *H04L 12/46* | (2006.01) | |
| *H04L 12/66* | (2006.01) | |
| *H04L 45/00* | (2022.01) | |
| *H04L 45/02* | (2022.01) | |
| *H04L 45/24* | (2022.01) | |
| *H04L 45/28* | (2022.01) | |
| *H04L 45/48* | (2022.01) | |
| *H04L 45/50* | (2022.01) | |
| *H04L 45/586* | (2022.01) | |
| *H04L 45/745* | (2022.01) | |
| *H04L 47/125* | (2022.01) | |
| *H04L 67/1097* | (2022.01) | |
| *H04L 67/55* | (2022.01) | |
| *H04L 49/25* | (2022.01) | |

(52) U.S. Cl.
CPC ............ *G06F 9/54* (2013.01); *G06F 16/2272* (2019.01); *G06F 16/2379* (2019.01); *G06F 16/27* (2019.01); *G06F 16/278* (2019.01); *H04L 12/2881* (2013.01); *H04L 12/44* (2013.01); *H04L 12/462* (2013.01); *H04L 12/4633* (2013.01); *H04L 12/4641* (2013.01); *H04L 12/66* (2013.01); *H04L 45/02* (2013.01); *H04L 45/08* (2013.01); *H04L 45/22* (2013.01); *H04L 45/24* (2013.01); *H04L 45/26* (2013.01); *H04L 45/28* (2013.01); *H04L 45/48* (2013.01); *H04L 45/50* (2013.01); *H04L 45/586* (2013.01); *H04L 45/66* (2013.01); *H04L 45/745* (2013.01); *H04L 47/125* (2013.01); *H04L 63/0272* (2013.01); *H04L 67/1097* (2013.01); *H04L 67/55* (2022.05); *G06F 2009/45595* (2013.01); *H04L 2012/4629* (2013.01); *H04L 49/25* (2013.01)

(58) Field of Classification Search
CPC ..... H04L 12/4641; H04L 12/66; H04L 45/02; H04L 45/24; H04L 45/26; H04L 45/28; H04L 45/48; H04L 45/50; H04L 45/586; H04L 45/66; H04L 45/745; H04L 47/125; H04L 63/0272; H04L 67/1097; H04L 67/26; H04L 49/25; H04L 2012/4629; G06F 16/27; G06F 16/2379; G06F 16/2272; G06F 16/278; G06F 9/45558; G06F 9/4881; G06F 2009/45595

See application file for complete search history.

(56) References Cited

U.S. PATENT DOCUMENTS

| | | | |
|---|---|---|---|
| 6,970,561 | B1 | 11/2005 | Obana |
| 7,274,869 | B1 | 9/2007 | Pan |
| 7,593,320 | B1 | 9/2009 | Cohen et al. |
| 7,945,813 | B1 | 5/2011 | Watson |
| 7,970,918 | B2 | 6/2011 | Thompson et al. |
| 8,060,533 | B1 | 11/2011 | Wheeler |
| 8,756,656 | B1 | 6/2014 | Hartmann |
| 8,849,955 | B2 | 9/2014 | Prahlad |
| 9,288,101 | B1 | 3/2016 | Dalal |
| 9,330,154 | B2 | 5/2016 | Di |
| 9,331,940 | B2 | 5/2016 | Balus |
| 9,544,185 | B1 | 1/2017 | Yadav |
| 9,652,483 | B1 | 5/2017 | Cao et al. |
| 10,200,274 | B1 | 2/2019 | Suryanarayana |
| 10,454,877 | B2 * | 10/2019 | Fernando .............. H04L 41/40 |
| 10,530,873 | B1 | 1/2020 | Arya |
| 10,931,530 | B1 | 2/2021 | Rzehak |
| 11,074,300 | B1 | 7/2021 | Falco |
| 2003/0012133 | A1 | 1/2003 | Jappinen |
| 2003/0012193 | A1 | 1/2003 | Novaes |
| 2004/0003064 | A1 | 1/2004 | Astley |
| 2004/0264460 | A1 | 12/2004 | Yoshimoto |
| 2005/0021622 | A1 | 1/2005 | Cullen |
| 2006/0136256 | A1 | 6/2006 | Roots |
| 2006/0233322 | A1 | 10/2006 | Allman |
| 2007/0074150 | A1 | 3/2007 | Jolfaei et al. |
| 2007/0086429 | A1 | 4/2007 | Lawrence |
| 2007/0104192 | A1 * | 5/2007 | Yoon ..................... H04L 45/16 370/389 |
| 2007/0291773 | A1 | 12/2007 | Khan |
| 2009/0043911 | A1 | 2/2009 | Flammer |
| 2009/0296579 | A1 | 12/2009 | Dharwadkar |
| 2010/0046531 | A1 | 2/2010 | Louati |
| 2010/0061366 | A1 | 3/2010 | DelRegno |
| 2010/0125574 | A1 | 5/2010 | Navas |
| 2010/0189115 | A1 | 7/2010 | Kitada |
| 2010/0189117 | A1 * | 7/2010 | Gowda ................. H04L 45/586 370/401 |
| 2010/0211781 | A1 | 8/2010 | Auradkar et al. |
| 2010/0250867 | A1 | 9/2010 | Bettger |
| 2010/0293235 | A1 | 11/2010 | Cadoret |
| 2011/0004913 | A1 * | 1/2011 | Nagarajan ............ H04L 63/102 726/1 |
| 2012/0201124 | A1 | 8/2012 | Marques |
| 2012/0281700 | A1 * | 11/2012 | Koganti ................. H04L 45/02 370/392 |
| 2012/0300782 | A1 | 11/2012 | Farinacci |
| 2013/0028073 | A1 | 1/2013 | Tatipamula |
| 2013/0188521 | A1 * | 7/2013 | Jain ....................... H04L 12/185 370/255 |
| 2013/0286846 | A1 | 10/2013 | Atlas et al. |
| 2013/0329584 | A1 | 12/2013 | Ghose et al. |
| 2013/0336164 | A1 | 12/2013 | Yang et al. |
| 2014/0044126 | A1 | 2/2014 | Sabhanatarajan et al. |
| 2014/0092901 | A1 | 4/2014 | Kapadia et al. |
| 2014/0112122 | A1 * | 4/2014 | Kapadia ................. H04L 45/74 370/219 |
| 2014/0207991 | A1 | 7/2014 | Kaushik |
| 2014/0233399 | A1 * | 8/2014 | Mann ..................... H04L 45/64 370/254 |
| 2014/0258485 | A1 | 9/2014 | Yang |
| 2014/0317616 | A1 * | 10/2014 | Chu .................... G06F 9/45533 718/1 |
| 2014/0366037 | A1 | 12/2014 | Berretta |
| 2014/0372748 | A1 | 12/2014 | Dixon |
| 2015/0010002 | A1 * | 1/2015 | Duda .................... H04L 45/745 370/392 |
| 2015/0124590 | A1 | 5/2015 | Chu |
| 2015/0172172 | A1 * | 6/2015 | DeCusatis ............. H04L 12/44 370/219 |
| 2015/0188753 | A1 | 7/2015 | Anumala et al. |
| 2015/0188808 | A1 | 7/2015 | Ghanwani |
| 2015/0195136 | A1 | 7/2015 | Mermoud |
| 2015/0199415 | A1 | 7/2015 | Bourbonnais |
| 2015/0263899 | A1 | 9/2015 | Tubaltsev |
| 2015/0304206 | A1 | 10/2015 | Filsfils et al. |
| 2015/0312134 | A1 | 10/2015 | Kapadia |
| 2015/0355946 | A1 | 12/2015 | Kang |
| 2016/0014025 | A1 * | 1/2016 | Wang ..................... H04L 45/66 370/392 |
| 2016/0028613 | A1 | 1/2016 | Haramaty |
| 2016/0065498 | A1 | 3/2016 | Harper |
| 2016/0112821 | A1 | 4/2016 | Raleigh |
| 2016/0142313 | A1 | 5/2016 | Devireddy et al. |
| 2016/0196320 | A1 | 7/2016 | Borowiec |
| 2016/0277210 | A1 | 9/2016 | Lin et al. |
| 2016/0294608 | A1 | 10/2016 | Biswal |
| 2016/0337231 | A1 | 11/2016 | Dixon |
| 2016/0352619 | A1 | 12/2016 | Gattani |
| 2016/0357778 | A1 | 12/2016 | MacKenzie |

(56) References Cited

U.S. PATENT DOCUMENTS

| | | | |
|---|---|---|---|
| 2017/0032011 A1 | 2/2017 | Song | |
| 2017/0041239 A1 | 2/2017 | Goldenberg | |
| 2017/0109369 A1 | 4/2017 | Feng | |
| 2017/0126486 A1 | 5/2017 | Prieto | |
| 2017/0155542 A1* | 6/2017 | Fang | H04L 41/0654 |
| 2017/0171057 A1* | 6/2017 | Dong | H04L 45/02 |
| 2017/0310548 A1* | 10/2017 | Jailani | H04L 41/0806 |
| 2017/0331669 A1 | 11/2017 | Ganesh | |
| 2018/0034665 A1* | 2/2018 | Nguyen | H04W 8/005 |
| 2018/0048591 A1 | 2/2018 | Sellappa et al. | |
| 2018/0062914 A1* | 3/2018 | Boutros | H04L 45/16 |
| 2018/0062993 A1* | 3/2018 | Wu | H04L 49/70 |
| 2018/0121433 A1 | 5/2018 | Nevrekar | |
| 2018/0167475 A1 | 6/2018 | Agarwal | |
| 2018/0167476 A1 | 6/2018 | Hoffner | |
| 2018/0183706 A1 | 6/2018 | Przygienda et al. | |
| 2018/0205634 A1 | 7/2018 | Avci et al. | |
| 2018/0219953 A1 | 8/2018 | Arra et al. | |
| 2018/0220283 A1 | 8/2018 | Condeixa | |
| 2018/0302321 A1* | 10/2018 | Manthiramoorthy | H04L 12/4641 |
| 2018/0351857 A1 | 12/2018 | Vairavakkalai | |
| 2019/0073419 A1 | 3/2019 | Dong | |
| 2019/0089575 A1 | 3/2019 | Pundir | |
| 2019/0104438 A1* | 4/2019 | Mittal | H04W 99/00 |
| 2019/0124013 A1 | 4/2019 | Murugesan | |
| 2019/0141112 A1 | 5/2019 | Kalathur | |
| 2019/0149361 A1 | 5/2019 | Sarwar | |
| 2019/0149896 A1 | 5/2019 | Gramm | |
| 2019/0155741 A1 | 5/2019 | Linke | |
| 2019/0182202 A1* | 6/2019 | Garcia Del Rio | H04L 49/70 |
| 2019/0207844 A1 | 7/2019 | Kodavanty | |
| 2019/0260670 A1 | 8/2019 | Kulkarni | |
| 2019/0327166 A1 | 10/2019 | Thubert | |
| 2019/0342389 A1 | 11/2019 | Bono | |
| 2019/0349426 A1 | 11/2019 | Smith | |
| 2019/0349733 A1 | 11/2019 | Nolan | |
| 2019/0363975 A1 | 11/2019 | Djernaes | |
| 2020/0036787 A1 | 1/2020 | Gupta | |
| 2020/0044963 A1 | 2/2020 | Kwok | |
| 2020/0084103 A1 | 3/2020 | Miller et al. | |
| 2021/0075630 A1* | 3/2021 | Immidi | H04L 12/4641 |

FOREIGN PATENT DOCUMENTS

| | | |
|---|---|---|
| CN | 101960426 A | 1/2011 |
| CN | 103984694 A | 8/2014 |
| CN | 104486124 | 4/2015 |
| CN | 105556502 A | 4/2016 |
| CN | 105991432 | 10/2016 |
| CN | 106878065 | 6/2017 |
| CN | 107547402 | 1/2018 |
| CN | 108075969 A | 5/2018 |
| EP | 3070877 | 9/2016 |
| JP | 2003204332 | 7/2003 |
| JP | 2015515809 | 5/2015 |
| JP | 2016536690 | 11/2016 |
| WO | 2015070236 | 5/2015 |

OTHER PUBLICATIONS

Sajassi et al., BGP MPLS-Based Ethernet VPN, Feb. 2015 (Year: 2015) (Year: 2016).*

Juniper, Understanding EVPN Pure Route Type-5 on QFX Series Switches, Jul. 2017 (Year: 2017).*

Samman et al. "Multicash parallel pipeline router architecture for network-on-chip." In: Proceedings of the conference on Design, automation and test in Europe. Mar. 2008 (Mar. 2008) Retrieved on Oct. 18, 2019 (Oct. 18, 2019) from <https://www.researchgate.net/profile/Manfred_Glesner/publication/221340626_Multicast_Parallel_Pipeline_Router_Architecture_for_Network-on-Chip/links/02bfe50de0dc34c390000000/Multicast-Parallel-Pipeline-Router-Architecture-for-Network-on-Chip.pdf> entire document.

Wu et al. A new multi-channel MAC protocol with on-demand channel assignment for multi-hop mobile ad hoc networks. Dec. 9, 2000 (Dec. 9, 2000) Retrieved on Oct. 13, 2019 (Oct. 13, 2019) from <http://citeseerx.ist.psu.edu/viewdoc/download?doi=10.1.1.457.5412&rep=rep1&type=pdf> entire document.

"Samman et al.""Multicast parallel pipeline router architecture for network-on-chip.""In: Proceedings of the conference on Design, automation and test in Europe. Mar. 2008 (Mar. 2008) Retrieved on Oct. 18, 2019 (Oct. 18, 2019) from <https://www.researchgate.net/profile/Manfred_Glesner/publication/221340626_Multicast_Parallel_Pipeline_Router_Architecture_for_Network-on-Chip/links/02bfe50de0dc34c390000000/Multic ast-Parallel-Pipeline-Router-Architecture-for-Network-on-Chip.pdf> entire document".

"Husseman.""A Beginner's Guide to Understanding the Leaf-Spine Network Topology.""In: West Monroe Partners. Mar. 23, 2015 (Mar. 23, 2015) Retrieved on Oct. 13, 2019 (Oct. 13, 2019) from <https://blog.westmonroepartners.com/a-beginners-guide-to-understanding-the-leaf-spine-network-topology/> entire document".

Juniper Networks, Understanding EVPN Pure Type 5 Routes, Sep. 16, 2022.

Internet Engineering Task Force (IETF) Request for Comments: 7432.

"Wu et al.""A new multi-channel MAC protocol with on-demand channel assignment for multi-hop mobile ad hoc networks.""In: Proceedings International Symposium on Parallel Architectures, Algorithms and Networks. Dec. 9, 2000 {Dec. 9, 2000) Retrieved on Oct. 13, 2019 (Oct. 13, 2019) from <http:/fciteseerx.ist.psu.edu/viewdoc/download?doi=1O.1.1.457 .5412&rep=rep 1 &type=pdf> entire document".

VXLAN Tutorial, Ohira Shinichi, Cisco Systems G.K., Jan. 20, 2016, p1 to 49 https://www.janog.gr.jp/meeting/janog37/download_file/vxlan.pdf.

* cited by examiner

First Hop Gateway Redundancy

Repair Path Signaling

ARP Sync

Steady State East-West Flows – Routed Locally

Steady State North-South Flows — Routed Locally

Link Failure – East-West Flow

Link Failure – North-South Flow

ARP Request To Orphan ESI Host

ARP Reply From Orphan ESI Host

FIRST HOP GATEWAY REDUNDANCY IN A NETWORK COMPUTING ENVIRONMENT

CROSS-REFERENCE TO RELATED APPLICATIONS

This application claims priority to U.S. Provisional Patent Application Ser. No. 62/722,003 filed Aug. 23, 2018 titled "DATABASE SYSTEMS METHODS AND DEVICES," which is incorporated herein by reference in its entirety, including but not limited to those portions that specifically appear hereinafter, the incorporation by reference being made with the following exception: In the event that any portion of the above-referenced application is inconsistent with this application, this application supersedes the above-referenced application.

TECHNICAL FIELD

The disclosure relates to computing networks and particularly relates to network topology and routing protocols in a computer networking environment.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connection over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding on the basis of routing tables which maintain a record of the routes to various network destinations. Routing tables may be specified by an administrator, learned by observing network traffic, or built with the assistance of routing protocols.

Small networks may use manually configured routing tables to determine how information should travel from one computer to another computer. A routing table may include a listing of "best paths" indicating the most efficient or most desirable paths between a starting computer and a final destination computer. Larger networks, including networks connected to the public Internet, may rely on complex topologies that can change rapidly such that the manual construction of routing tables is unfeasible. Dynamic routing attempts to solve this problem by constructing routing tables automatically based on information carried by routing protocols. Dynamic routing enables a network to act nearly autonomously in avoiding network failures and blockages. There exist multiple routing protocols that provide rules or instructions for determining best paths between networked device. Examples of dynamic routing protocols and algorithms include Routing Information Protocol (RIP), Open Shortest Path First (OSPF), Enhanced Interior Gateway routing Protocol (EIGRP), and Border Gateway Protocol (BGP).

In some instances, path selection involves applying a routing metric to multiple routes to select or predict the best route. Most routing algorithms use only one network path at a time. Multiple path routing techniques enable the use of multiple alternative paths. In computer networks, a routing algorithm may be used to predict the best path between two compute instances. The routing algorithm may be based on multiple factors such as bandwidth, network delay, hop count, path cost, load, maximum transfer unit, reliability, and communication cost. The routing table stores a listing of the best paths. A topological database may store a list of the best paths and may further store additional information.

In some networks, routing is complicated by the fact that no single entity is responsible for selecting best paths. Instead, multiple entities are involved in selecting best paths or event portions of a single path. In the context of computer networking over the Internet, the Internet is partitioned into autonomous systems (AS) such as Internet Service Providers (ISPs). Each autonomous system controls routes involving its network. Autonomous system-level paths are selected based on the Border Gateway Protocol (BGP). Each autonomous system-level path includes a sequence of autonomous systems through which packets of information flow to travel from one compute instance to another compute instance. Each autonomous system may have multiple paths from which to choose that are offered by neighboring autonomous systems.

There are numerous network topologies that have varying benefits and deficiencies for different computing applications. One network topology is the leaf-spine network topology that includes spine nodes in communication with multiple leaf nodes. Traditional routing protocols for a leaf-spine network topology have numerous deficiencies and can lead to ineffective data loops when a leaf node has gone inactive. There exists a desire for an improved labeling protocol and routing protocol for leaf-spine network topologies.

In light of the foregoing, disclosed herein are systems, methods, and devices for improved routing operations in a network computing environment.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
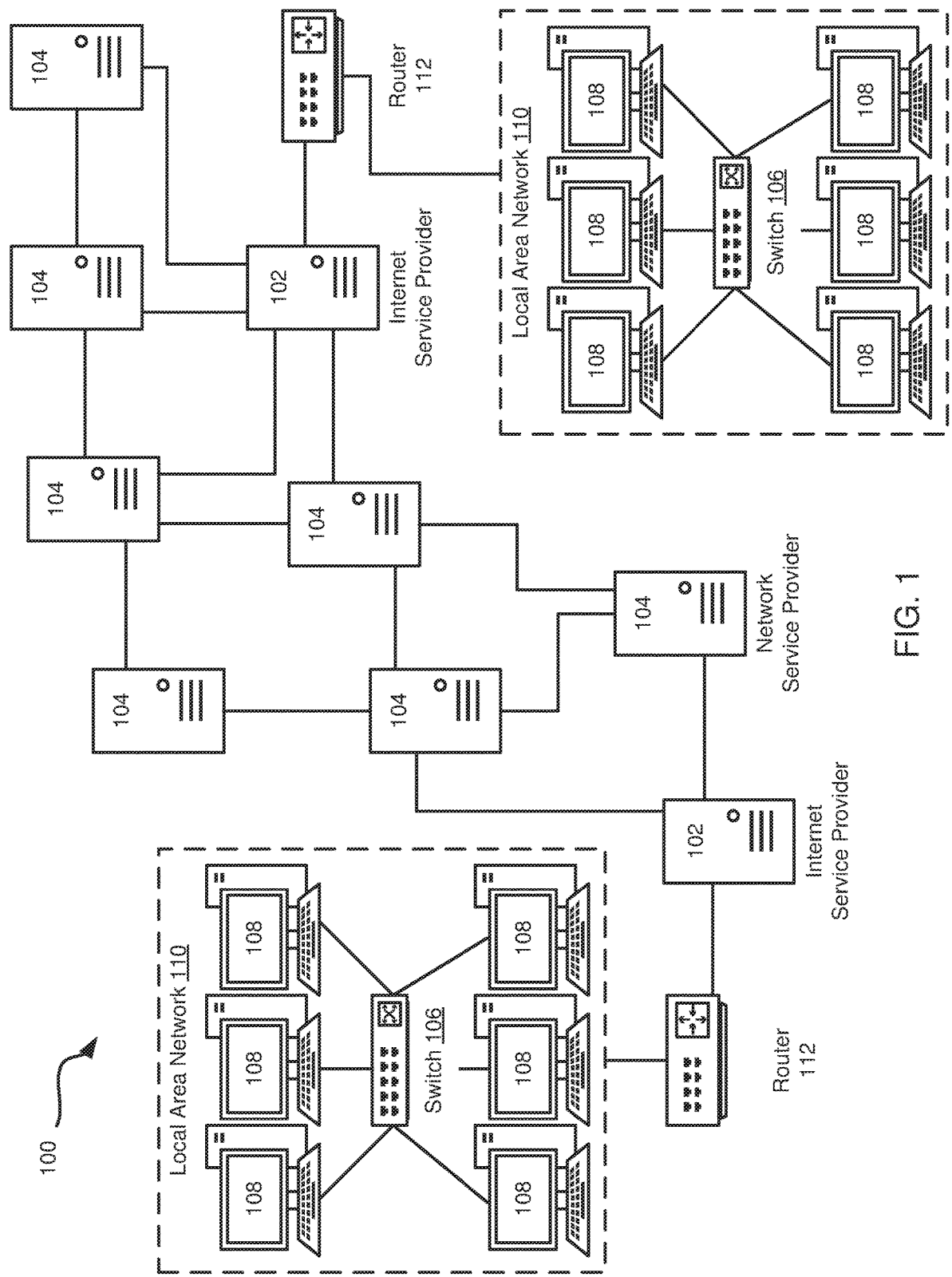
FIG. 1 is a schematic diagram of a system of networked devices communicating over the Internet.

Disclosed herein are systems, methods, and devices for improved network topology, routing labeling, and routing protocols in a network computing environment. An embodiment of the disclosure is a network with a first hop gateway redundancy between a first switch and a second switch. In the network, one or more host virtual machines are connected to the first switch and the second switch by way of a virtual interface. The first hop gateway redundancy provides a solution for best path redundancy using a multi chassis bond interface.

In an embodiment, a system includes a network with a first hop gateway redundancy. The system includes a first switch and a second switch in a network topology. The system includes a host virtual machine in communication with at least one of the first switch and the second switch. The system includes a routed peer link connecting the first switch to the second switch. The system is such that the first switch and the second switch have the same Internet protocol (IP) address and media access control (MAC) address.

In a computer network environment, a networking device such as a switch or router may be used to transmit information from one destination to a final destination. In an embodiment, a data package and a message may be generated at a first location such as computer within a person's home. The data package and the message could be generated from the person interacting with a web browser and requesting information from or providing information to a remote server accessible over the Internet. In an example, the data package and the message could be information the person input into a form accessible on a webpage connected to the Internet. The data package and the message may need to be transmitted to the remote server that may be geographically located very far from the person's computer. It is very likely that there is no direct communication between the router at the person's home and the remote server. Therefore, the data package and the message must travel by "hopping" to different networking devices until reaching the final destination at the remote server. The router at the person's home must determine a route for transmitting the data package and the message thru multiple different devices connected to the Internet until the data package and the message reach the final destination at the remote server.

The processes of determining a best bath from a first location to a final destination and forwarding data packages and messages to a next destination are significant functions performed by a networking device such as a switch or router. The connections between networking devices in a network is referred to as the network topology. Network topology is the arrangement of elements such as links and nodes in a communication network. A network topology may include wired links, wireless links, or a combination of wired and wireless links between nodes in the network. Some examples of wired links include coaxial cables, telephone lines, power lines, ribbon cables, optical fibers, and so forth. Some examples of wireless links include satellites, cellular signals, radio signals, free-space optical communication, and so forth. The network topology includes an indication of all nodes in the network (e.g. computers, routers, switches, and other devices) and an indication of the linkages between nodes. Disclosed herein are systems, methods, and devices for improving network topology and network routing.

For purposes of furthering understanding of the disclosure, some explanation will be provided for numerous networking computing devices and protocols.

A BGP instance is a device for routing information in a network. A BGP instance may take the form of a route reflector appliance. The BGP instance may run on a switch, router, or BGP speakers on a switch. At a high level, the BGP instance sends all the paths it has learnt for a prefix to the best path controller. The best path controller responds with a set of best path from amongst those paths. The best path controller is permitted to modify the next-hop and attributes for any of the paths. Once the best paths are received, the BGP instance updates the local Routing Information Base (RIB) and advertises the best path out to its neighbors.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A customer edge router (CE router) is a router located on the customer premises that provides an interface between the customer's LAN and the provider's core network. CE routers, provider routers, and provider edge routers are components in a multiprotocol label switching architecture. Provider routers are located in the core of the provider's or carrier's network. Provider edge routers sit at the edge of the network. Customer edge routers connect to provider edge routers and provider edge routers connect to other provider edge routers over provider routers.

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its final destination. The routing table may further include quality of service associate with the route, links to filtering criteria lists associated with the route, interface for an Ethernet card, and so forth.

For purposes of illustrating the concept of a routing table, the routing table may be analogized to using a map for delivering a package. A routing table is similar to the use of a map for delivering a package to its final destination. When a node needs to send data to another node on a network, the node must first know where to send the data. If the node cannot directly connect to the destination node, the node must send the data to other nodes along a proper route to the destination node. Most nodes do not try to figure out which routes might work. Instead, a node will send an IP packet to a gateway in the LAN, which then decides how to route the data to the correct destination. Each gateway will need to keep track of which way to deliver various packages of data, and for this it uses a routing table. A routing table is a database that keeps track of paths, like a map, and uses these paths to determine which way to forward traffic. Gateways can also share the contents of their routing table with other nodes requesting the information.

For hop-by-hop routing, each routing table lists, for all reachable destinations, the address of the next device along the path to that destination, i.e. the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

The Open Systems Interconnection (OSI) model is a conceptual model that characterizes and standardizes the communication functions of a computing system without regard to its underlying internal structure and technology. The goal of the OSI model is the interoperability of diverse communication systems with standard communication protocols. The OSI model partitions a communication system into abstraction layers. A layer serves the layer above it and is served by the layer below. For example, a layer that provides error-free communications across a network provides the path needed by applications above it, while it calls the next lower layer to send and receive packets that constitute the contents of that path. Two instances at the same layer are visualized as connected by a horizontal connection in that layer. Communication protocols enable an entity in one host to interact with a corresponding entity at the same layer in another host. Service definitions, like the OSI model, abstractly describe the functionality provided to an (N)-layer by an (N−1)-layer, wherein N is one of the layers of protocols operating in the local host.

Route control is a type of network management that aims to improve Internet connectivity and reduce bandwidth cost and overall internetwork operations. Some route control services include a suite of hardware-based and software-based products and services that work together to improve overall Internet performance and finetune the use of available Internet bandwidth at minimal cost. Route control can be successful in scenarios where a network or autonomous system is sourcing Internet bandwidth from multiple providers. Route control can aid in the selection of the most optimal path for data transmission.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

A known algorithm for determining the best path for the transmission of data is referred to as the Border Gateway Protocol (BGP). BGP is a path-vector protocol that provides routing information for autonomous systems on the Internet. When BGP is configured incorrectly, it can cause sever availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with he lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

Equal cost multipath (ECMP) routing is a routing strategy where next-hop packet forwarding to a single destination can occur over multiple "best paths." The multiple best paths are equivalent based on routing metric calculations. Multiple path routing can be used in conjunction with many routing protocols because routing is a per-hop decision limited to a single router. Multiple path routing can substantially increase bandwidth by load-balancing traffic over multiple paths. However, there are numerous issues known with ECMP routing when the strategy is deployed in practice. Disclosed herein are systems, methods, and devices for improved ECMP routing.

A Clos network can be deployed in telecommunications. A Clos network is a multistage circuit-switching network that represents an idealization of multistage switching systems. A Clos network includes three stages, including the ingress stage, the middle stage, and the egress stage. Each stage is made up of a number of crossbar switches. Each cell enters an ingress crossbar switch that can be routed through any of the available middle stage crossbar switches to the relevant egress crossbar switch. A middle stage crossbar is available for a particular new call if both the link connecting the ingress switch to the middle stage switch, and the link connecting the middle stage switch to the egress switch, are free.

A leaf-spine network topology can be deployed for connecting nodes in a computer network. The leaf-spine topology has two layers, including the leaf layer and the spine layer. The leaf layer consists of access switches that connect to devices like servers, firewalls, load balancers, and edge routers. The spine layer is made up of switches that perform routing and forms the backbone of the network where every leaf switch is interconnected with each spine switch. In a leaf-spine topology, all devices are located the same number of links away from each other and include a predictable and consistent amount of delay or latency for transmitting information.

A virtual local area network (VLAN) is a broadcast domain that is partitioned and isolated in a computer network at the data link layer. A VLAN may apply tags to network frames and handle those tags in networking systems to create the appearance and functionality of network traffic that is physically on a single network but acts as if it is split between separate networks. VLANs can keep network applications separate despite being connected to the same physical network, and without requiring multiple sets of cabling and networking devices to be deployed.

A switched virtual interface (SVI) is a virtual interface and port that transmits untagged-VLAN packets for a managed switch. Traditionally, switches send traffic only to hosts within the same broadcast domain (single VLAN) and routers handle traffic between different broadcast domains (different VLANs). In such an implementation, network devices in different broadcast domains cannot communicate without a router. When an SVI is implemented, a switch may use a virtual Layer3 interface to route traffic to other Layer3 interfaces. This eliminates the need for a physical router. VLANs reduce the load on a network by dividing a LAN into smaller segments and keeping local traffic within a VLAN. However, because each VLAN has its own domain, there is a need for a mechanism for VLANs to pass data to other VLANs without passing the data through a router. The SVI is such a mechanism. An SVI is normally found on switches (for example, Layer3 and Layer2 switches). When an SVI is implemented, a switch can recognize packet destinations that are local to the sending VLAN and can switch those packets destined for different VLANs. In an embodiment, there is one-to-one mapping between a VLAN and an SVI. In such an embodiment, only a single SVI can be mapped to a VLAN.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for tracking the life cycle of objects in a network computing environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a schematic diagram of a system 100 for connecting devices to the Internet. The system 100 includes multiple local area network 160 connected by a switch 106. Each of the multiple local area networks 160 can be connected to each other over the public Internet by way of a router 162. In the example system 100 illustrated in FIG. 1, there are two local area networks 160. However, it should be appreciated that there may be many local area networks 160 connected to one another over the public Internet. Each local area network 160 includes multiple computing devices 108 connected to each other by way of a switch 106. The multiple computing devices 108 may include, for example, desktop computers, laptops, printers, servers, and so forth. The local area network 160 can communicate with other networks over the public Internet by way of a router 162. The router 162 connects multiple networks to each other. The router 162 is connected to an internet service provider 102. The internet service provider 102 is connected to one or more network service providers 104. The network service providers 104 are in communication with other local network service providers 104 as shown in FIG. 1.

The switch 106 connects devices in the local area network 160 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all of the functions normally performed by a router. However, some network switches are limited to supporting a single type of physical network, typically Ethernet, whereas a router may support different kinds of physical networks on different ports.

The router 162 is a networking device that forwards data packets between computer networks. In the example system 100 shown in FIG. 1, the routers 162 are forwarding data packets between local area networks 160. However, the router 162 is not necessarily applied to forwarding data packets between local area networks 160 and may be used for forwarding data packets between wide area networks and so forth. The router 162 performs traffic direction functions on the Internet. The router 162 may have interfaces for different types of physical layer connections, such as copper cables, fiber optic, or wireless transmission. The router 162 can support different network layer transmission standards. Each network interface is used to enable data packets to be forwarded from one transmission system to another. Routers 162 may also be used to connect two or more logical groups of computer devices known as subnets, each with a different network prefix. The router 162 can provide connectivity within an enterprise, between enterprises and the Internet, or between internet service providers' networks as shown in FIG. 1. Some routers 162 are configured to interconnecting various internet service providers or may be used in large enterprise networks. Smaller routers 162 typically provide connectivity for home and office networks to the Internet. The router 162 shown in FIG. 1 may represent any suitable router for network transmissions such as an edge router, subscriber edge router, inter-provider border router, core router, internet backbone, port forwarding, voice/data/fax/video processing routers, and so forth.

The internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be appreciated that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. In light of the foregoing, disclosed herein are systems, methods, and devices for offloading best path computations to an external device to enable greater customizability in determining a best path algorithm that is well suited to a certain grouping of computers or a certain enterprise.

FIGS. 2-10 illustrate embodiments of a network for implementing a first hop gateway redundancy. In an embodiment, the host virtual machines are connected to switches. The switches are depicted as T1 and T2 in FIGS. 2-10. The embodiments in FIGS. 2-10 are illustrative of a means for building a best path redundancy using a multi chassis bond interface.

The topology of the embodiments of FIGS. 2-10 includes an interface spread across the host virtual machines to the switches T1 and T2. This interface is part of the same bond interface on the host virtual machines. The links terminate to a virtual local area network (VLAN) on each of the switches T1 and T2. The embodiments may be deployed in a Layer3 routing interface that serves as the first hop gateway. In such an embodiment, if a host virtual machine needs to reach another host virtual machine, a communication may be facilitated by one or more of the switches T1 and T2. The switches T1 and T2 together act as a virtual first hop gateway for the host virtual machines. The switches T1 and T2 are configured with the same gateway IP address and the same gateway MAC address from the point of view of a host virtual machine. Therefore, from the point of view of a host virtual machine, the host virtual machine is talking to a single gateway IP rather than two gateway IPs located on two different switches T1 and T2.

Redundancy is achieved by configuring the same IP and MAC addresses on the switches T1 and T2. Further, a routed peer link that includes the IP and MAC addresses is configured between the switches T1 and T2.

The switches T1 and T2 may signal to one another by way of Border Gateway Protocol (BGP) signaling. In an embodiment, T1 and T2 each signal their end of a repair path for handling link failures.

In an embodiment, there is a repair path for handling link failure. For example, the link between the switch T1 and a host virtual machine fails. There is a need to enable T2 to use a repair path to redirect traffic coming from the host virtual machine. This enables reachability to the Ethernet segment identifier (ESI) by way of the routed peer link. T2 may receive a BGP message from T1 indicating that T1 has reachability to ESI by way of the next hop thru T1. Any host virtual machine that T1 learns by way of the bond will install as an anchor path for the directly connected host virtual machine. In the case of a link failure, an automated repair path is activated to send traffic through the switch T2.

In an embodiment, an ARP SYNC is performed for switch T1 to route a packet to the host virtual machine. The ARP SYNC includes syncing ARP tables within T1 and T2. If T1 learns a change from the host virtual machine, T1 may use BGP EVPN signaling to sync with T2. BGP signaling may be automatically transmitted when there is a change. When switch T1 learns ARP binding on host H1 on a local area SVI interface, T1 may generate a BGP EVPN route type 2 message to T2 that carries the IP and site on which the IP is learned.

In an embodiment, an ARP reply is generated from an orphan ESI host. The ARP reply may be performed using messaging between switches T1 and T2 to send an ARP request. The ARP replay may be send back using BGP EVPN route type 2 messaging between the switches T1 and T2.

In an embodiment, a link between a switch T1, T2 and a host virtual machine or virtual consumer electronics device may fail. If the link fails, the path may be removed from forwarding. The switch with the failed link may automatically remove the fault path. The switch may have learned all routes and aggregated the routes to a routed overlay protocol, and the faulty path may then be withdrawn from those routes so that any traffic destined would no longer be sent by way of the failed link.

Figure 2:
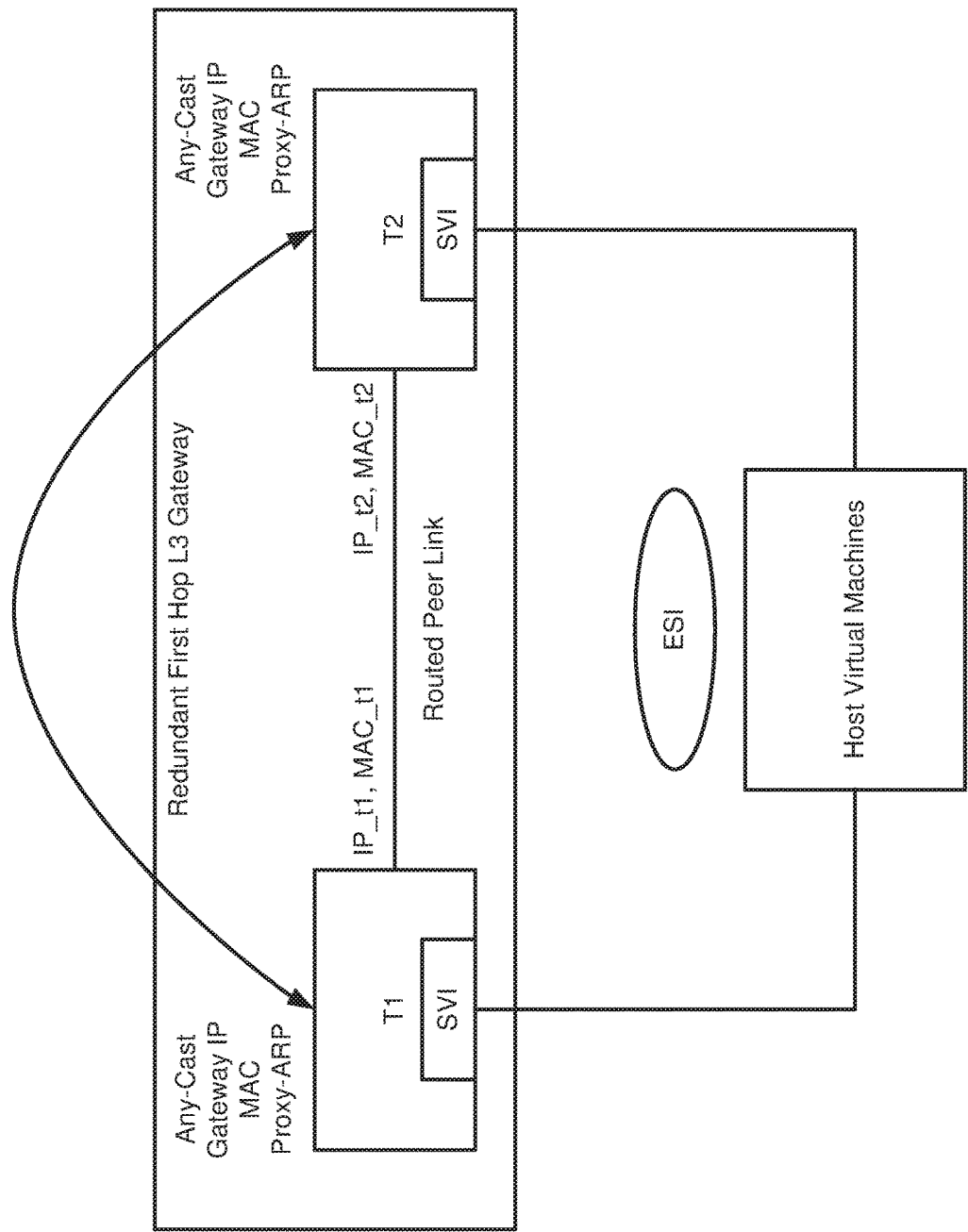
FIG. 2 is a schematic diagram of a network with a first hop gateway redundancy between a first switch and a second switch.

FIG. 2 is a schematic diagram of a network with a first hop gateway redundancy. The network includes T1 and T2 representing networking devices such as a switch or router. Each of T1 and T2 includes a switch virtual interface (SVI). There is a routed peer link between T1 and T2. Each of T1 and T2 includes an anycast gateway IP, an anycast MAC, and an anycast proxy-ARP. T1 advertises a local peer link IP referred to as IP_t1. T2 advertises a local peer link IP referred to as IP_t2. T1 advertises a media access control (MAC) address referred to as MAC_t1. T2 advertises a MAC address referred to as MAC_t2. T1 and T2 communicate with host virtual machines by way of the SVI connection.

The network is configured such that T1 and T2 serve as redundant anycast centralized gateways. T1 and T2 are gateways for hosts that are multi-homed by way of an L2 LAG bundle. T1 and T2 are configured with an SVI and any anycast gateway MAC along with an anycast gateway IP for North-South routing. T1 and T2 are configured with a common ethernet virtual private network (EVPN) ethernet segment identifier (ESI) representing the link aggregation (LAG) main port. T1 and T2 are configured with an EVPN instance per-VLAN with media access control-virtual routing and forwarding route targets (MAC-VRF RTs). The MAC-VRF RTs may be automatically derived or manually configured. T1 and T2 are configured with a Layer3 enable peer link to be used for protection. In an embodiment, a BGP-EVPN session is set up between T1 and T2 to advertise local peer link IP (may be referred to as IP_t1 and IP_t2) as the next hops.

In the network, there is a BGP-EVPN control plane to signal a repair path by way of RT-1. The BGP-EVPN control plane further signals an ARP SYNC by way of RT-2 and an ARP request by way of RT-2.

In a datacenter network, a first hop gateway redundancy may be provided using an ethernet virtual private network and RT-1 based protection signaling. In this configuration, an L3 routed network north of T1/T2 is assumed. In this instance, there is only L2 connectivity on access and IP unicast traffic. In an implementation, only L2 connectivity is allowed access.

Figure 3:
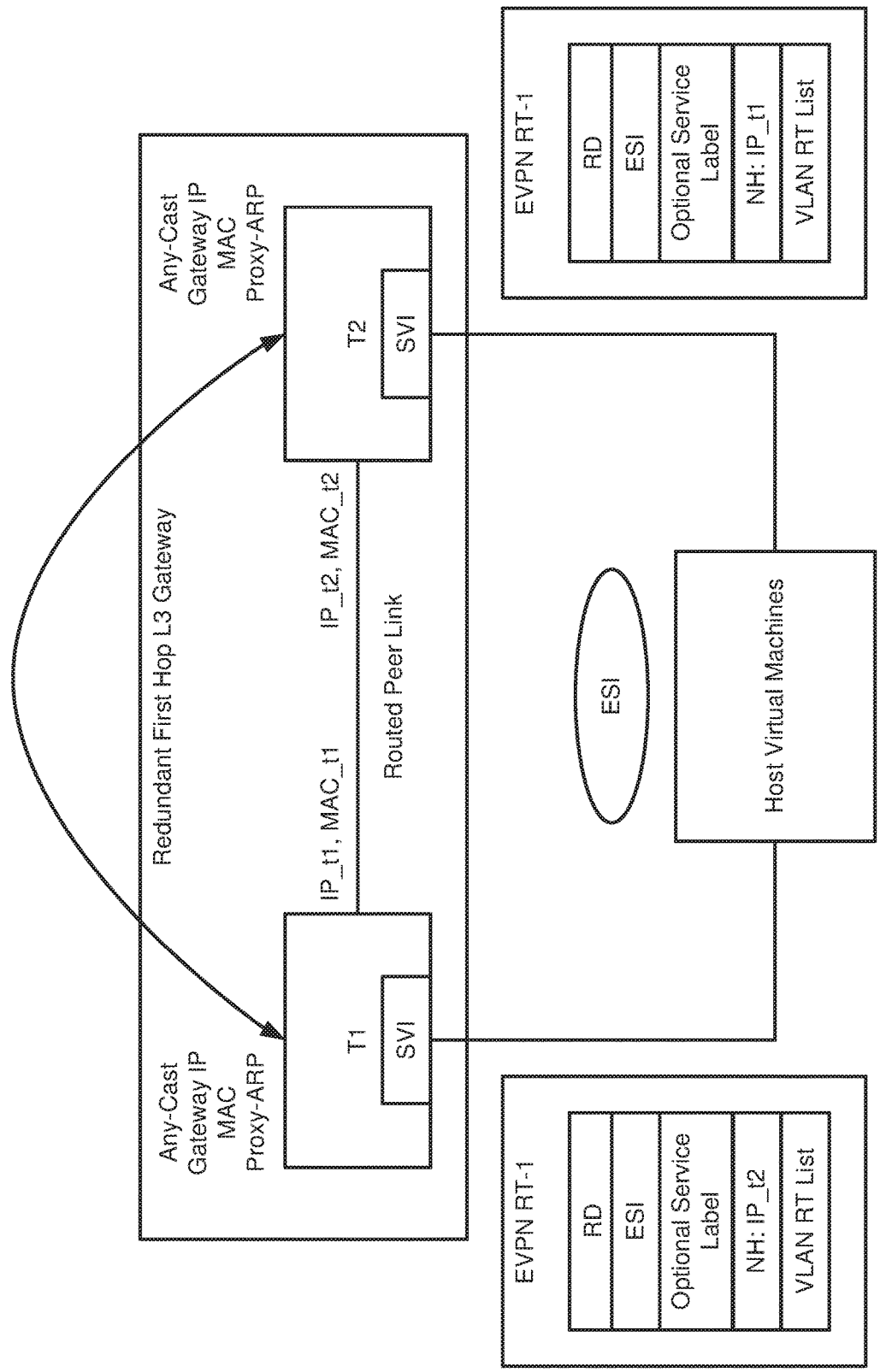
FIG. 3 is a schematic diagram of a network with a first hop gateway redundancy between a first switch and a second switch that is implementing repair path signaling.

FIG. 3 illustrates a network that provides repair path signaling by way of an EVPN RT-1. In the network, T1 and T2 peers exchange per-ESI RT-1 (Ethernet AD route) with IP_t1 and IP_t2 next hops. This signals local ESI connectivity across redundancy group peers. Further, per-ESI RT-1 is advertised with EVI-RTs for VLANs configured on an ESI main port to be used for import into MAC-VRF. This per-ESI RT-1 is leveraged to signal a Layer3 repair path to all directly connected hosts on a given ESI by way of the redundancy group peer.

In an embodiment, the RT-1 is required for repair path signaling as an RT-2 may not always be generated by both T1 and T2 depending on where the ARP is learnt. In such an embodiment, an ESI that does not have a repair path signaled from any peer would be considered and handled as an orphan ESI.

Figure 4:
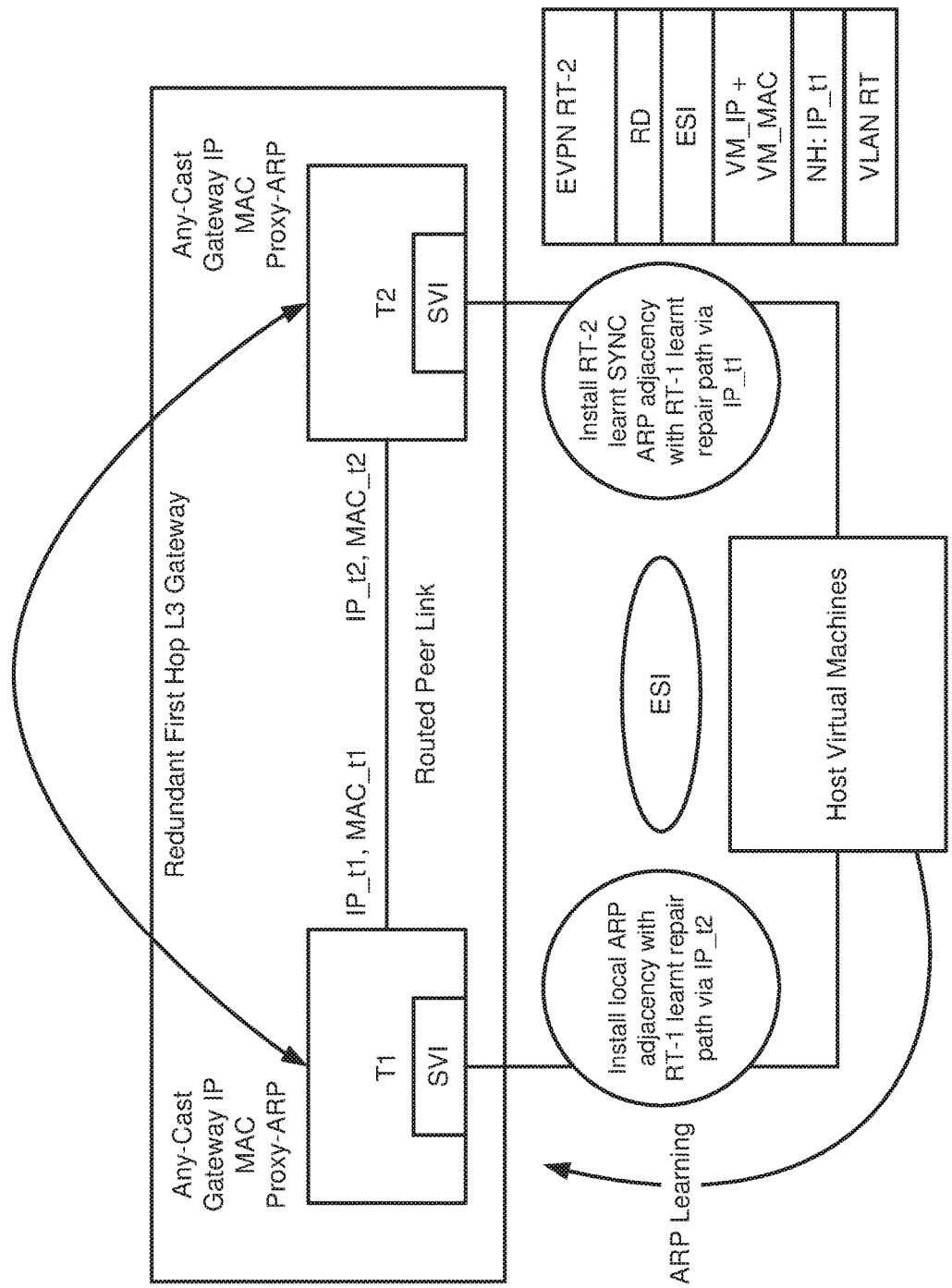
FIG. 4 is a schematic diagram of a network with a first hop gateway redundancy between a first switch and a second switch that is implementing a sync of address resolution protocol (ARP) tables.

FIG. 4 is a schematic diagram of a network that provides a host adjacency sync and repair path programming. The network may learn local (for example, MAC+IP and/or SVI) from a local ARP cache. This is given EVPN context derived from the SVI to the VLAN. The network may learn local (MAC to AC) by way of an HW MAC learning update within a given EVPN context derived from the MAC source. The network may further perform a local MAC+IP resolution by way of a local MAC to derive a port and/or ESI for an ARP learnt MAC+IP. Once resolved, the network may advertise EVPN MAC+IP RT-2 for the purpose of MAC+IP sync across redundancy group peers, for example from T1 to T2.

The network may refer to T2 to import the MAC+IP RT-2 into MAC-VRF by way of EVI-RT mapping. The network may resolve the MAC+IP RT-2 from T1 by way of a per-ESI RT-1 from T1 and a lookup local ESI DB to check for local connectivity to ESI for the received MAC+IP. If the received ESI is local and up, the network may install a static ARP entry for the received IP on a local VLAN SVI interface if it is not dynamically learnt. The FIB may be accessed to install the ARP learnt adjacency route with protection by way of an RT-1 learnt next hop for the corresponding ESI.

All host adjacencies learnt on a local ESI (dynamic or SYNCed) are installed with protection by way of an RT-1 learnt repair path for that ESI.

The network may provide for T2 ESI failure handling. In the case of a failure, the network may active a repair path by way of a redundant peer.

Figure 5:
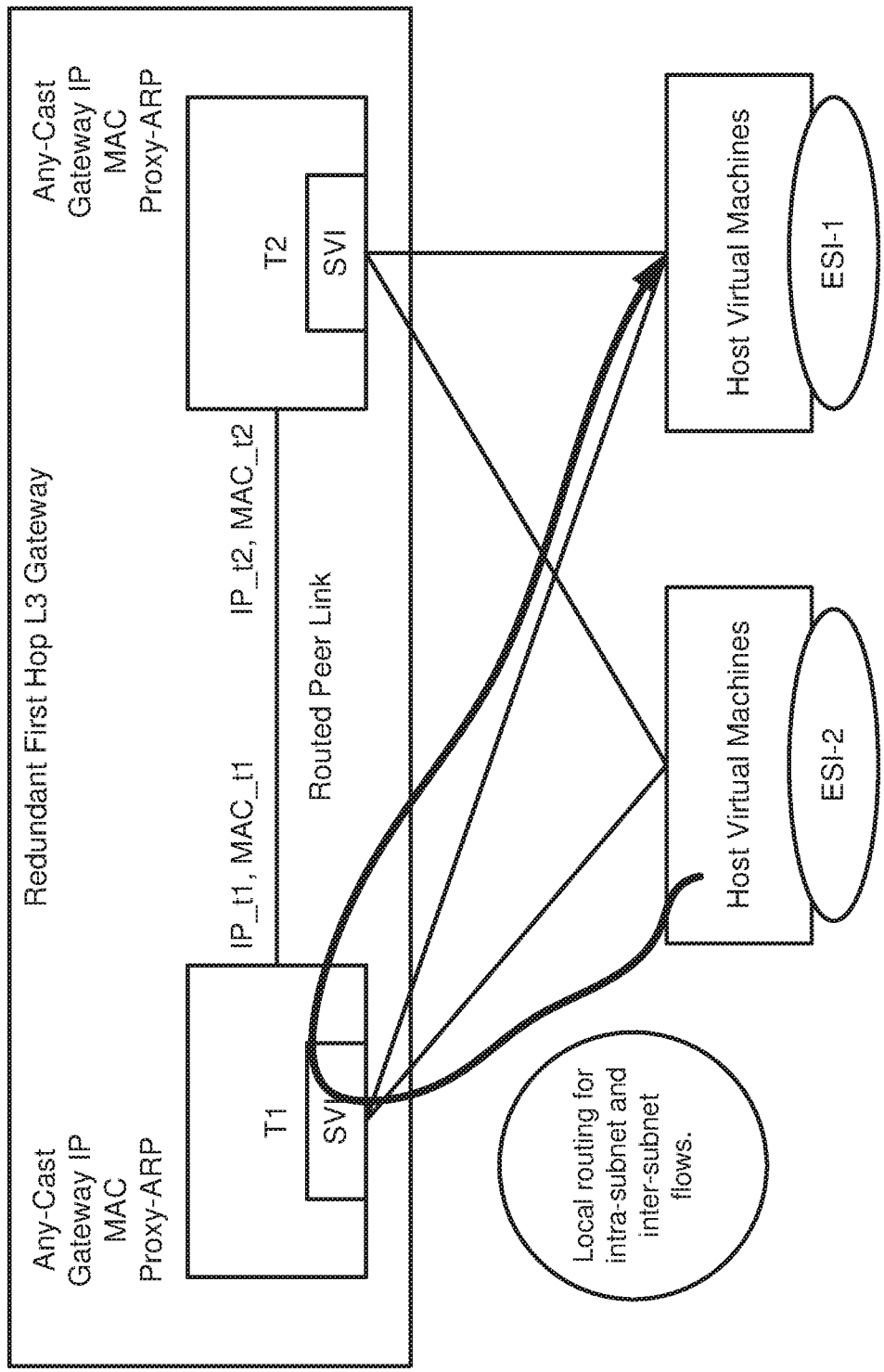
FIG. 5 is a schematic diagram of a network with a first hop gateway redundancy between a first switch and a second switch illustrating steady state East-West flow.

FIG. 5 is a schematic diagram of a network with steady state East-West flows that are routed locally. The network includes host virtual machines with the Ethernet segment identifier (ESI). One grouping of host virtual machines is associated with ESI-2 and the other group is associated with ESI-1. The steady state East-West flow includes local routing for both intra-subnet and inter-subnet flows. As shown in FIG. 5, there is steady state flow from the host virtual machines storing ESI-2 to the host virtual machines storing ESI-1. There is communication between the host virtual machines and each of T1 and T2.

The network may provide for East-West intra-subnet flows to avoid any L2 flooding or bridging of East-West traffic flows. This may be accomplished with a proxy ARP mechanism. The ARP mechanism may transmit broadcast ARP requests received from access-facing hosts that are bridged to the local SVI interface. In an embodiment, the ARP requests are not flooded on other L2 ports in the VLAN. In such an embodiment, ARP requests received on the SVI interface are proxy replied to with the anycast gateway MAC. Similarly, ARP requests originating on the gateway are flooded on the local ESI and local orphan ESI ports and never flooded to the peer gateway. The SVI interface may be, accordingly, configured with proxy-ARP and proxy-ND for complete hosts to which reachability has been established with a local ARP/ND entry or by way of remote MAC+IP RT-2. In such an embodiment, any East-West, including intra-subnet flows may be L2 terminated on the gateway and routed to the destination adjacency. This may be performed similar to North-South flow illustrated in FIG. 6.

Figure 6:
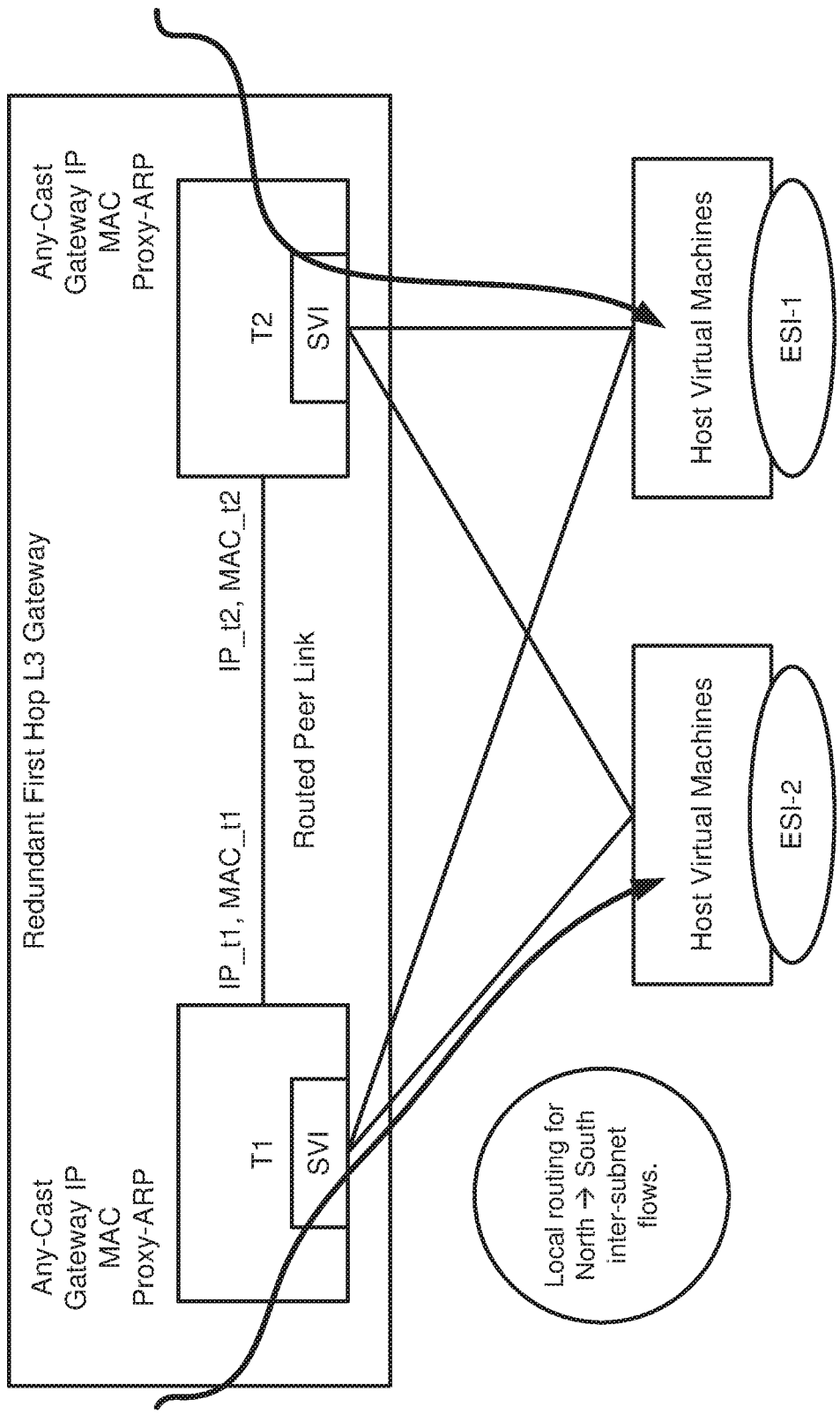
FIG. 6 is a schematic diagram of a network with a first hop gateway redundancy between a first switch and a second switch illustrating steady state North-South flow.

FIG. 6 is a schematic diagram of a network with steady state North-South flows that are routed locally. The steady state North-South flow includes local routing for North to South inter-subnet flows. As shown in FIG. 6, there is steady state flow from T1 to the host virtual machines storing ESI-2 and from T2 to the host virtual machines storing ESI-1. FIG. 6 illustrates steady state North-South traffic flow to a multi-homed host. Traffic destined to the host IP, received at the TOR is routed directly to the host.

Figure 7:
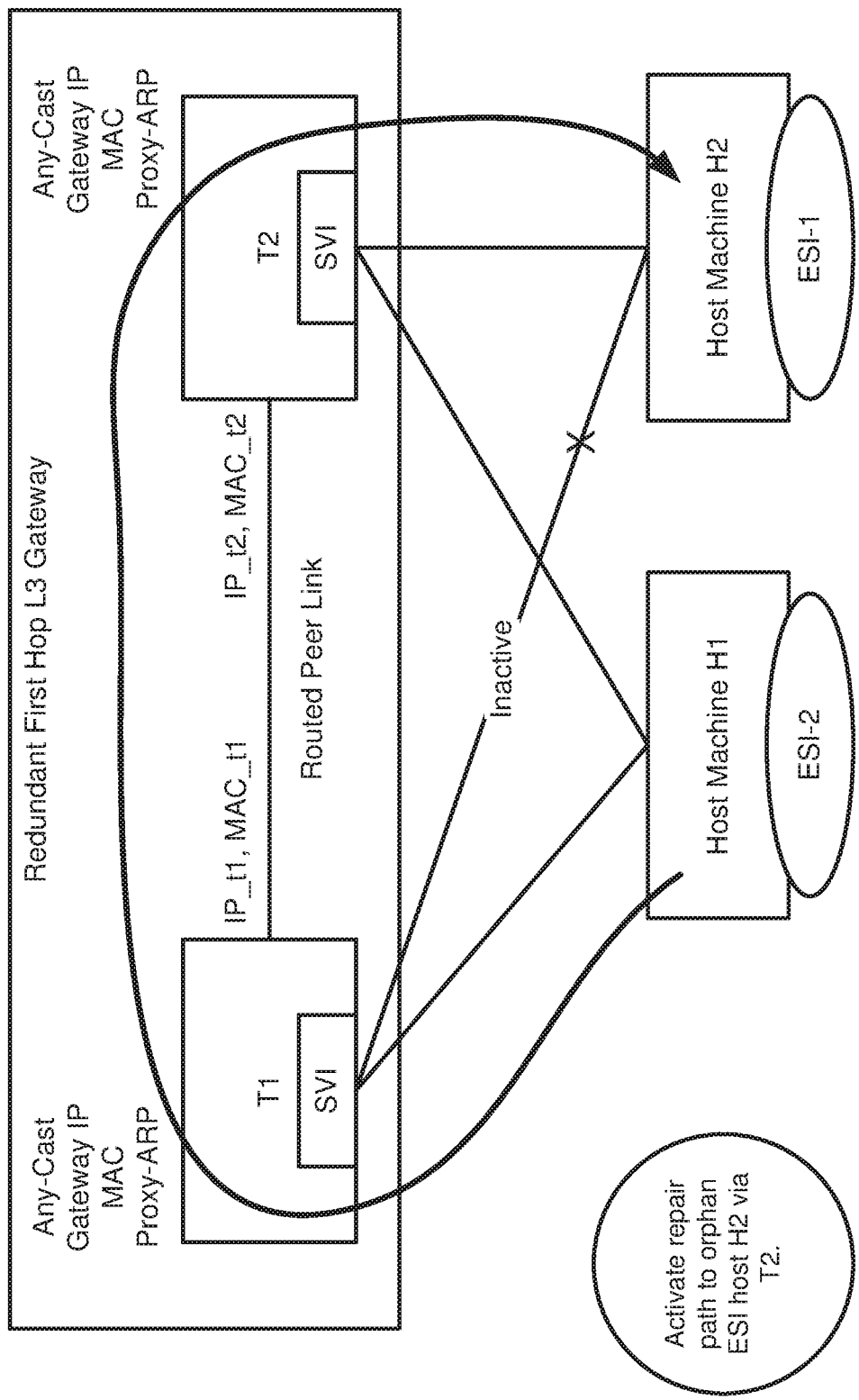
FIG. 7 is a schematic diagram of a network with a first hop gateway redundancy between a first switch and a second switch illustrating a link failure in the East-West flow.

FIG. 7 is a schematic diagram of a network with a link failure in the East-West flow. The link from T1 to the host machine H2 is inactive and has failed. All traffic routed to hosts on the failed ESI via subnet route may be rerouted by way of the peer routed peer link. Further, the network may withdraw local per-ESI RT-1 (a mass withdraw) while routed traffic flows continue to be routed by way of the subnet route in a load balanced manner across T1 and T2. In this manner, flows arriving at T2 are rerouted by way of the routed peer link to T1. This routes the flows directly to a connected host on the now orphan ESI (illustrated in FIG. 8).

Figure 8:
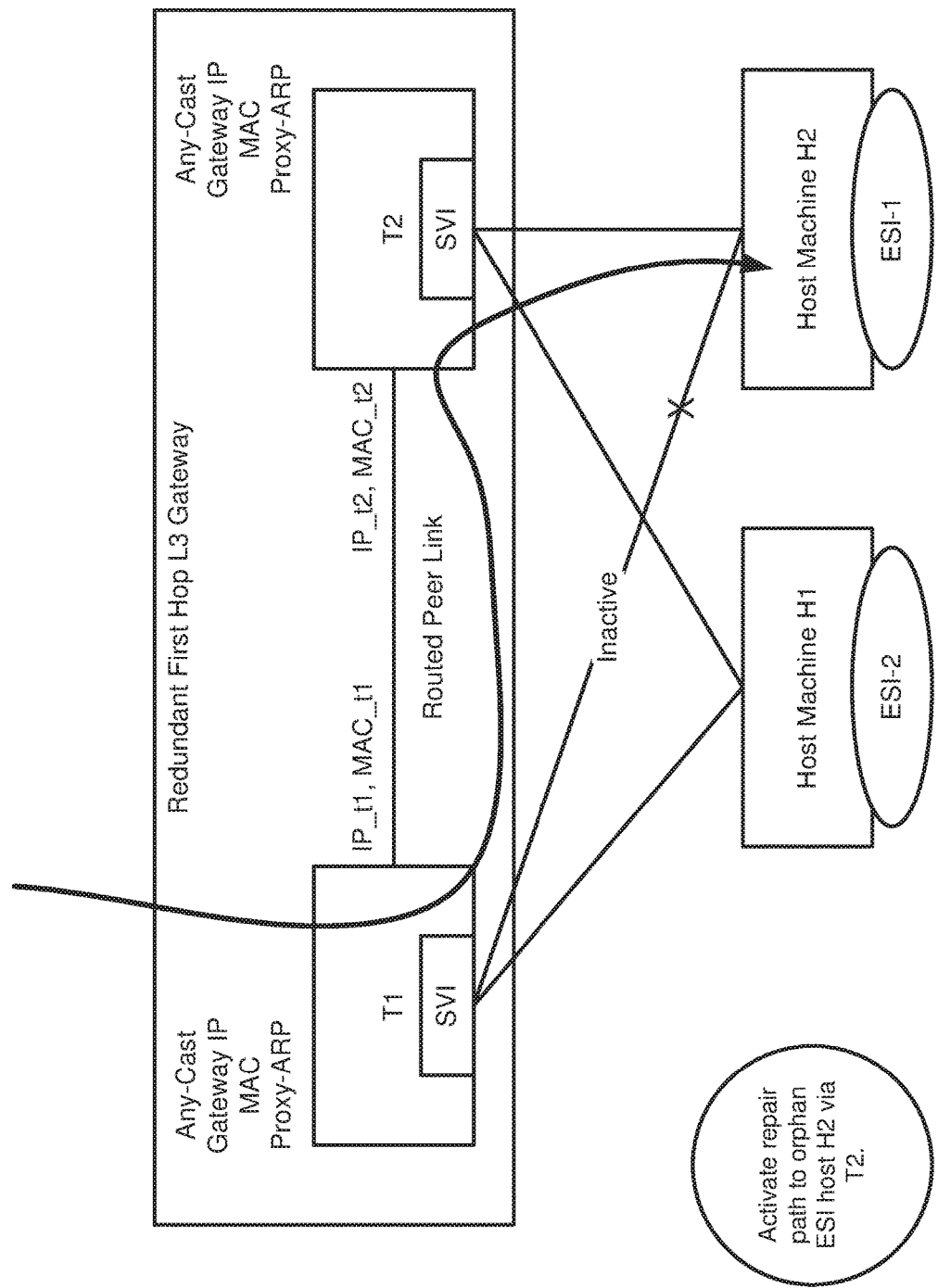
FIG. 8 is a schematic diagram of a network with a first hop gateway redundancy between a first switch and a second switch illustrating a link failure in the North-South flow.

FIG. 8 illustrates a schematic diagram of a network with a link failure in the North-South flow. The network activates a repair path to the orphan ESI host on H2 by way of the routed peer link to T2. The link from T1 to the host machine H2 is inactive and has failed. As illustrated in the steady state North-South flows illustrated in FIG. 6, flows are typically routed from T1 and/or T2 directly to the corresponding host virtual machine grouping. When the link from T1 to host machine H2 has failed, flows can be routed from T1 to T2 by way of the routed peer link. The flow can then be routed to the appropriate host machine H2.

Further, the flows arriving at T2 can be rerouted by way of the routed peer link to T1 which will route the flows directly to the connected host on the now orphan ESI as illustrated in FIG. 8. The network may provide for T1 "orphan ESI" handling. The network may, for each ESI RT-1, commit a mass withdraw from T2. This can cause local ESI to move to the "orphan" state. The network may reprogram forwarding to remove repair path programming on mass withdraw from the peer.

The network may RT-1 mass withdraw from T1. This can cause the MAC+IP RT-2 path from T1 to be unresolved. In response, the network may remove statically sourced SYNC-ARP if present as a result of MAC+IP RT-2 from T1 and inject host routes into the default routing control plane for all host adjacencies (i.e., ARP entries) learnt on an orphan ESI. Once injected, the more specific routes will allow flows destined to hosts on an orphan port to converge to the direct path to T1.

Figure 9:
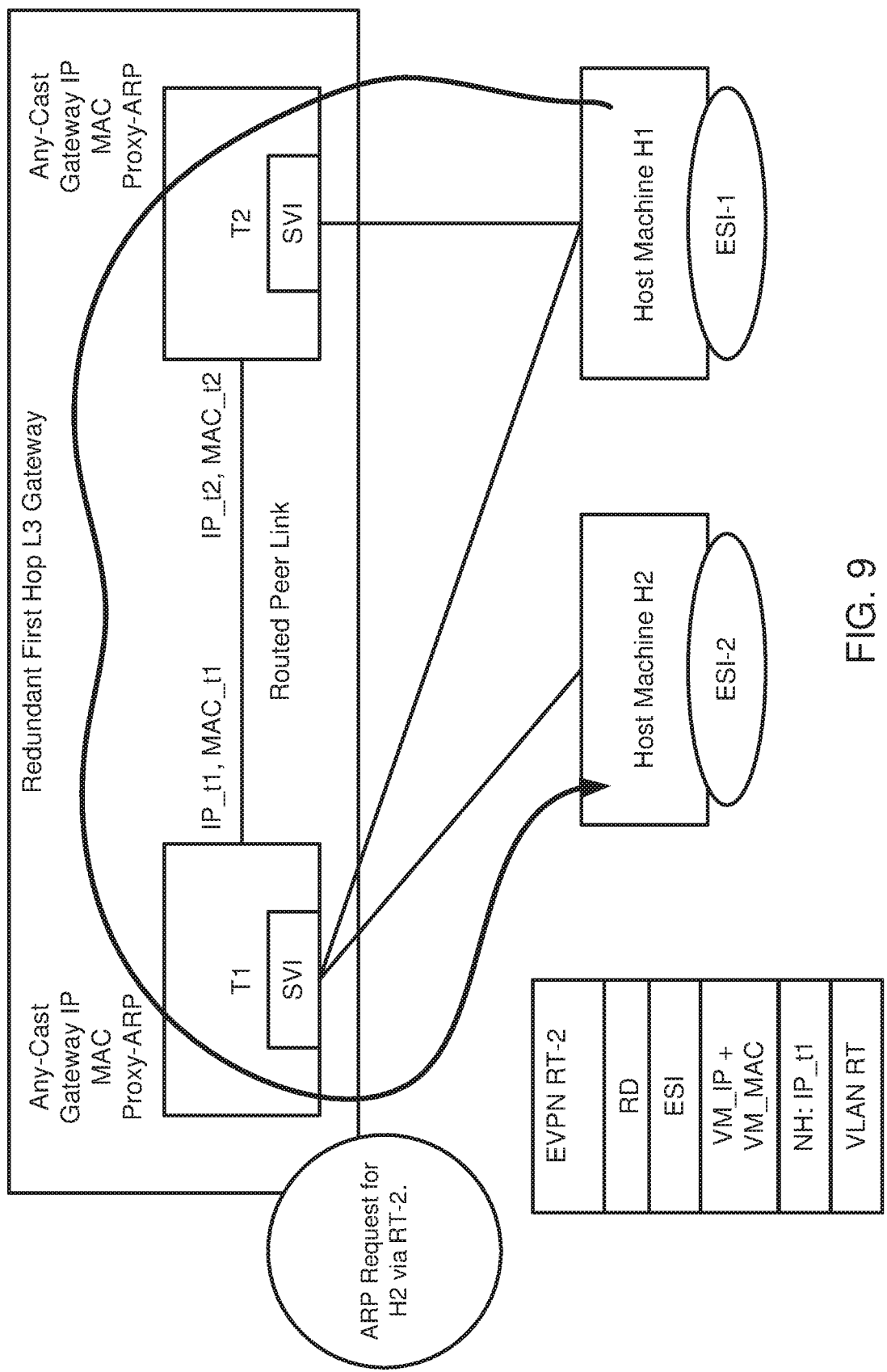
FIG. 9 is a schematic diagram of a network with a first hop gateway redundancy between a first switch and a second switch illustrating a request for an address resolution protocol (ARP) to an orphan Ethernet segment identifier (ESI) host.
Figure 10:
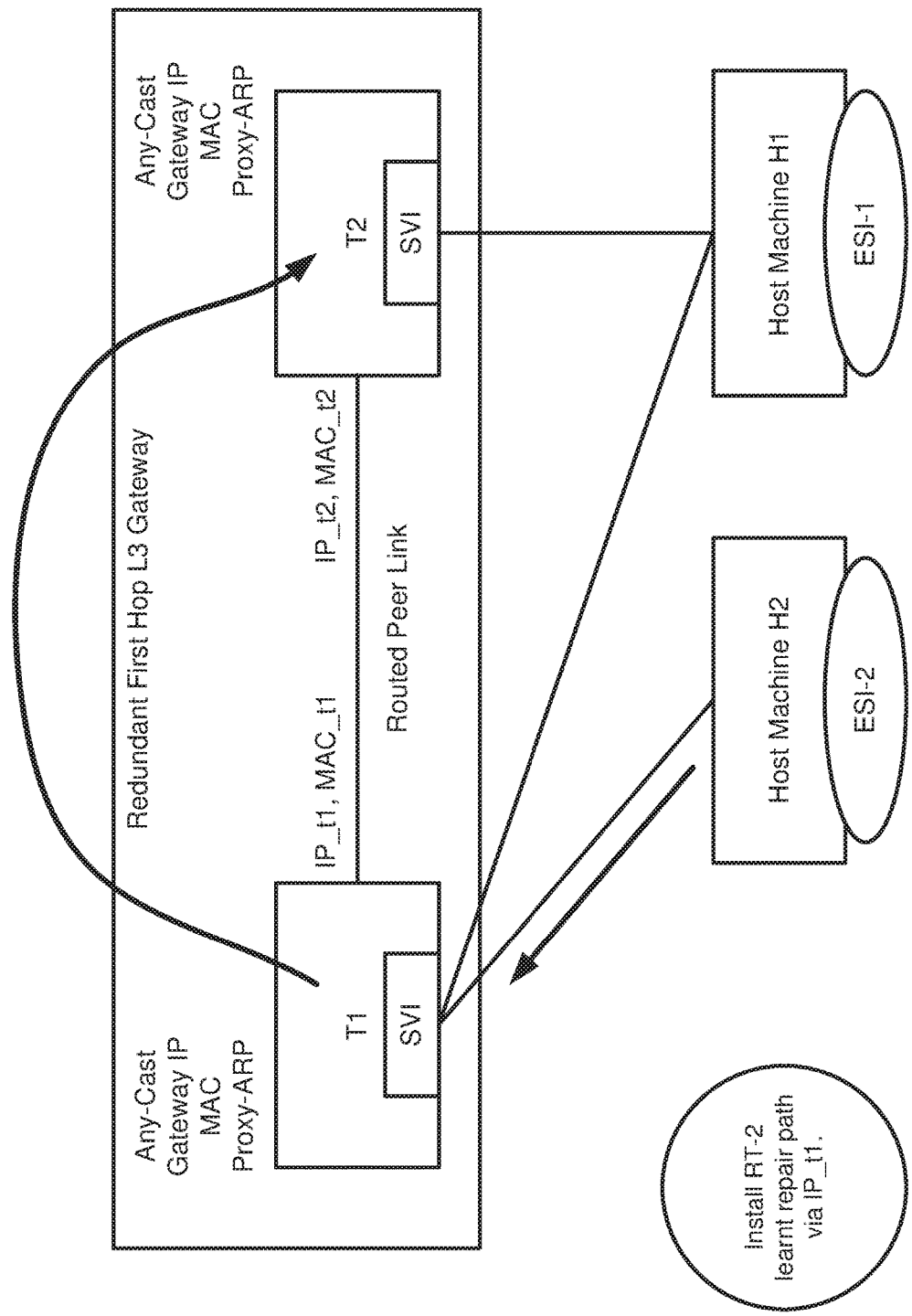
FIG. 10 is a schematic diagram of a network with a first hop gateway redundancy between a first switch and a second switch illustrating a reply from an orphan ESI host with an ARP.

FIG. 9 is a schematic diagram of a network performing an ARP request to an orphan ESI host. The network may perform an "ARPing" of an orphan ESI host wherein ARP is an address resolution protocol. For example, to maintain both East-West and North-south reachability to hosts on a T1 orphan ESI by way of T2, T2 must be able to ARP a host on a T1 orphan ESI. In the absence of a Layer2 extension between T1 and T2, an alternate mechanism is required to ARP orphan hosts on the peer gateway.

The network shown in FIG. 9 resolves the orphan ESI. The network may overload BGP RT-2 to send ARP request to the peer gateway as shown in FIG. 9. In this manner, T2 receives an ARP request to host IP1 on SVI or needs to ARP host IP1 because of glean. T2 may send an ARP request by way of MAC+IP RT-2 to T1. In response, T1 generates an ARP request on the local ESI and local orphan ESI ports. T1 learns an ARP entry for the local host IP1 and generates a MAC+IP1 RT-2. T2 can install reachability to IP1 over the routed peer link as illustrated in FIG. 9 to reply to the orphan ESI host (illustrated in FIG. 10).

In an embodiment of any of the networks illustrated in FIGS. 2-10, virtual routing and forwarding (VRF) support may be provided. To facilitate VRF, a network using [VRF, ESI] RT-1 and ESI RT-1 learns a repair path. This is performed with an L3-VPN label attribute. In the absence of an overlay, a repair path may be sent over a directly connected peer link with a per-VRF MPLS VPN encapsulation as follows:

[VRF, IP/32] to adjacency to [IP/32, SVI] to [MAC, ESI-port] (primary path); or

[VRF, IP/32] to adjacency to [IP_t1, P] to MAC_t1+VPN label (backup path)

Alternatively, layer-3 VLAN tagged sub-interfaces may be used as peer links in place of a VPN label to achieve repair path forwarding in a multi-tenant environment.

In an embodiment, an alternative for overlay VPN support and peer link is provided. In an example, after a VXLAN overlay is enabled, a directly connected peer link may no longer be required. In the absence of a peer link, a VPN overlay stretches across the redundancy group. To that end, an L3-VNI/VSLAN encapsulated repair path advertised via per-[VRF, ESI] EAD RT-1 may replace the directly connected peer link repair path.

In an example, with a steady state on T2, the encapsulation may be implemented as follows:

[VRF, IP/32] to adjacency to [IP/32, SVI] to [MAC, ESI-port] (primary path); or

[VRF, IP/32] to L3-VNI+VXLAN tunnel path to VTEP-T1 (backup path).

In the case of a post-ESI failure on T2, traffic is routed on the overlay repair path as follows:

[VRF, IP/32] to L3-VNI+VXLAN tunnel path to VTEP-T1

However, if the subnet is stretched beyond the redundancy group, reachability from remote leaf nodes may be established by way of the tunnel path, similar to above:

[VRF, IP/32] to L3-VNI+VXLAN tunnel path to VTEP-T1.

Glean handling may be similar to handling for orphan ESI hosts as disclosed above. However, the network may advertise MAC+IP RT-2 with MAC as all ones within the stretched EVI to trigger local ARP from all ToRs participating in the EVI.

Figure 11:
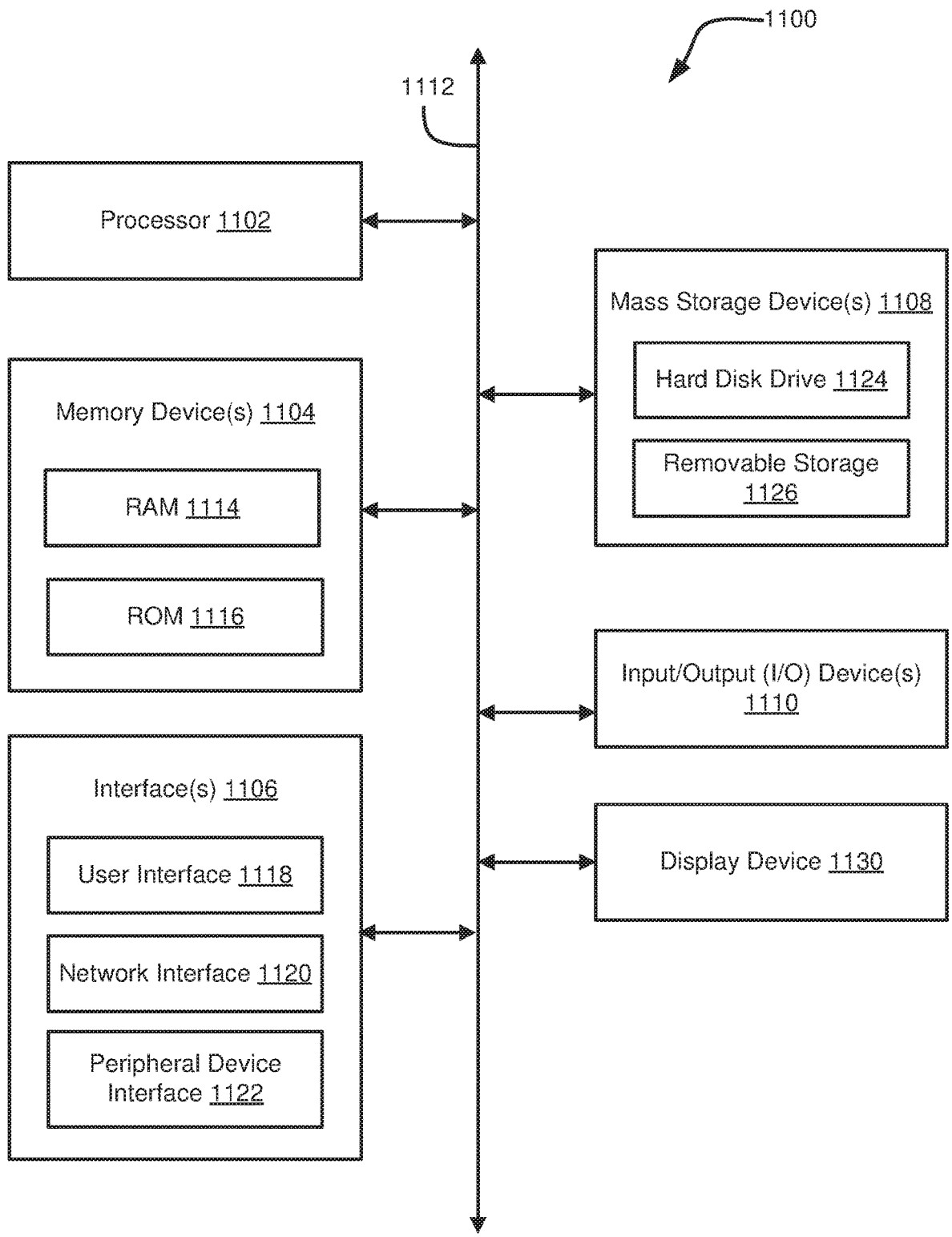
FIG. 11 is a schematic diagram illustrating components of an example computing device.

Referring now to FIG. 11, a block diagram of an example computing device 1100 is illustrated. Computing device 1100 may be used to perform various procedures, such as those discussed herein. In one embodiment, the computing device 1100 can function to perform the functions of the asynchronous object manager and can execute one or more application programs. Computing device 1100 can be any of a wide variety of computing devices, such as a desktop computer, in-dash computer, vehicle control system, a notebook computer, a server computer, a handheld computer, tablet computer and the like.

Computing device 1100 includes one or more processor(s) 1102, one or more memory device(s) 1104, one or more interface(s) 1106, one or more mass storage device(s) 1108, one or more Input/output (I/O) device(s) 1102, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

Input/output (I/O) device(s) 1102 include various devices that allow data and/or other information to be input to or retrieved from computing device 1100. Example I/O device(s) 1102 include cursor control devices, keyboards, keypads, microphones, monitors or other display devices, speakers, printers, network interface cards, modems, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 may include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, or any suitable user interface now known to those of ordinary skill in the field, or later discovered), keyboards, and the like.

Bus 1112 allows processor(s) 1102, memory device(s) 1104, interface(s) 1106, mass storage device(s) 1108, and I/O device(s) 1102 to communicate with one another, as well as other devices or components coupled to bus 1112. Bus 1112 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1100 and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

EXAMPLES

The following examples pertain to further embodiments.

Example 1 is a system. The system includes a first switch in a network topology. The system includes a second switch in the network topology. The system includes a host virtual machine in communication with at least one of the first switch and the second switch. The system includes a routed peer link connecting the first switch to the second switch. The system is such that the first switch and the second switch have the same Internet protocol (IP) address and media access control (MAC) address.

Example 2 is a system as in Example 1, wherein the first switch and the second switch are configured as a redundant anycast centralized gateway for the host virtual machine.

Example 3 is a system as in any of Examples 1-2, wherein the first switch and the second switch and configured with a common Ethernet segment identifier (ESI) representing a main port on the host virtual machine.

Example 4 is a system as in any of Examples 1-3, wherein each of the first switch and the second switch is configured with an Ethernet virtual private network (EVPN) instance per virtual local area network (VLAN) with one or more of: an automatically derived media access control-virtual routing and forwarding route target (MAC-VRF RT); or a manually configured MAC-VRF RG.

Example 5 is a system as in any of Examples 1-4, wherein the routed peer link is a Layer-3 enabled peer link.

Example 6 is a system as in any of Examples 1-5, wherein one or more of the first switch or the second switch is configured to advertise the routed peer link IP address as a next hop for the host virtual machine.

Example 7 is a system as in any of Examples 1-6, wherein the system is an Ethernet virtual private network (EVPN) using RT-1 protection signaling.

Example 8 is a system as in any of Examples 1-7, wherein the first switch and the second switch exchange a per- Ethernet segment identifier (ESI) route by way of the routed peer link to signal local ESI connectivity across a redundancy group formed by the first switch and the second switch.

Example 9 is a system as in any of Examples 1-8, wherein the per-ESI route is a repair path for use when a link between the host virtual machine and one of the first switch or the second switch has failed.

Example 10 is a system as in any of Examples 1-9, wherein the per-ESI route is transmitted between the first switch and the second switch as a Border Gateway Protocol (BGP) message.

Example 11 is a system as in any of Examples 1-10, wherein the first switch and the second switch are configured to sync an address resolution protocol (ARP) table by way of the routed peer link.

Example 12 is a system as in any of Examples 1-11, wherein the first switch comprises one or more processors configurable to execute instructions stored in non-transitory computer readable storage media, the instructions comprising: receiving a message from the host virtual machine indicating that an update has been made to the ARP table; and signaling the update to the second switch by way of a BGP message.

Example 13 is a system as in any of Examples 1-12, wherein the first switch and the second switch make up a redundancy group and wherein one or more of the first switch and the second switch are configured to advertise an Ethernet virtual private network (EVPN) MAC address to sync the redundancy group.

Example 14 is a system as in any of Examples 1-13, wherein the first switch and the second switch make up a redundancy group such that traffic flowing to or from the host virtual machine is load balanced across the first switch and the second switch.

Example 15 is a system as in any of Examples 1-14, wherein the traffic is load balanced by rerouting traffic across the routed peer link.

Example 16 is a system as in any of Examples 1-15, further comprising a link between the first switch and the host virtual machine, wherein the link terminates to a virtual local area network (VLAN) on the first switch.

Example 17 is a system as in any of Examples 1-16, wherein the first switch and the second switch are configured to act as a virtual first hop gateway for the host virtual machine.

Example 18 is a system as in any of Examples 1-17, further comprising an Ethernet segment identifier (ESI) on the host virtual machine, wherein the first switch and the second switch have reachability to the ESI by way of the routed peer link.

Example 19 is a system as in any of Examples 1-18, wherein the first switch is configured to transmit a Border Gateway Protocol (BGP) message to the second switch indicating that the second switch has reachability to the ESI by way of a next hop thru the first switch.

Example 20 is a system as in any of Examples 1-19, wherein the first switch is configured to automatically transmit a Border Gateway Protocol (BGP) message to the second switch by way of the routed peer link in response to the first switch learning of an update to an address resolution protocol (ARP) table on the host virtual machine.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
   a first switch in a network topology and a second switch in the network topology, wherein each of the first switch and the second switch comprises one or more processors, a memory, and a switch virtual interface for communicating with a virtual Layer3 interface to route traffic to other Layer3 interfaces;
   a host virtual machine comprising a communication link with each of the first switch and the second switch; and
   a routed peer link connecting the first switch to the second switch;
   wherein the first switch and the second switch have a same gateway Internet protocol (IP) address and gateway media access control (MAC) address such that a single virtual interface including the gateway IP address and gateway MAC address is spread across both the first switch and the second switch;

wherein the first switch further has a first IP address and a first MAC address and the second switch further has a second IP address and a second MAC address, the first IP address being different from the second IP address and the first MAC address being different from the second MAC address; and wherein the first switch and the second switch are configured to:
- signal, to one another, a repair path for redirecting traffic when the communication link between the host virtual machine and either of the first switch or the second switch experiences a failure;
- sync ARP tables through border gateway protocol (BGP) ethernet virtual private network (EVPN) messages;
- generate the BGP EVPN messages in response to binding of the host virtual machine to a switch virtual interface (SVI) interface of the first and second switches.

2. The system of claim 1, wherein the first switch and the second switch are configured as a redundant anycast centralized gateway for the host virtual machine.

3. The system of claim 1, wherein the first switch and the second switch are configured with a common Ethernet segment identifier (ESI) representing a main port on the host virtual machine.

4. The system of claim 1, wherein each of the first switch and the second switch is configured with an Ethernet virtual private network (EVPN) instance per virtual local area network (VLAN) with one or more of:
- an automatically derived media access control-virtual routing and forwarding route target (MAC-VRF RT); or
- a manually configured MAC-VRF RG.

5. The system of claim 1, wherein the routed peer link is a Layer-3 enabled peer link.

6. The system of claim 1, wherein the first switch is configured to advertise the first IP address as a next hop for the host virtual machine.

7. The system of claim 1, wherein the system is an Ethernet virtual private network (EVPN) using RT-1 protection signaling.

8. The system of claim 1, wherein the first switch and the second switch exchange a per-Ethernet segment identifier (ESI) route by way of the routed peer link to signal local ESI connectivity across a redundancy group formed by the first switch and the second switch.

9. The system of claim 8, wherein the per-ESI route is the repair path for use when the communication link between the host virtual machine and either of the first switch or the second switch has failed.

10. The system of claim 8, wherein the per-ESI route is transmitted between the first switch and the second switch as a Border Gateway Protocol (BGP) message.

11. The system of claim 1, wherein the first switch and the second switch make up a redundancy group and wherein one or more of the first switch and the second switch are configured to advertise an Ethernet virtual private network (EVPN) MAC address to sync the redundancy group.

12. The system of claim 1, wherein the first switch and the second switch make up a redundancy group such that traffic flowing to or from the host virtual machine is load balanced across the first switch and the second switch.

13. The system of claim 12, wherein the traffic is load balanced by rerouting traffic across the routed peer link.

14. The system of claim 1, wherein the communication link between the host virtual machine and the first switch terminates to a virtual local area network (VLAN) on the first switch.

15. The system of claim 1, wherein the first switch and the second switch are configured to act as a virtual first hop gateway for the host virtual machine.

16. The system of claim 1, further comprising an Ethernet segment identifier (ESI) on the host virtual machine, wherein the first switch and the second switch have reachability to the ESI by way of the routed peer link.

17. The system of claim 16, wherein the first switch is configured to transmit a Border Gateway Protocol (BGP) message to the second switch indicating that the second switch has reachability to the ESI by way of a next hop thru the first switch.

* * * * *